United States Patent
Hawkins et al.

(10) Patent No.: US 8,112,666 B2
(45) Date of Patent: Feb. 7, 2012

(54) MESSAGE PRODUCER WITH MESSAGE TYPE VALIDATION

(75) Inventors: John Christopher Hawkins, Southampton (GB); David John Vines, Romsey (GB)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 12/709,666

(22) Filed: Feb. 22, 2010

(65) Prior Publication Data
US 2010/0229024 A1  Sep. 9, 2010

(30) Foreign Application Priority Data
Mar. 3, 2009 (EP) .................................... 09154251

(51) Int. Cl.
*G06F 11/00* (2006.01)

(52) U.S. Cl. ................ 714/25; 714/4.1; 714/21; 714/49

(58) Field of Classification Search .................... 714/25, 714/49
See application file for complete search history.

(56) References Cited

U.S. PATENT DOCUMENTS
5,734,903 A * 3/1998 Saulpaugh et al. ........... 719/316
* cited by examiner

*Primary Examiner* — Charles Ehne
(74) *Attorney, Agent, or Firm* — A. Bruce Clay

(57) ABSTRACT

Message type validation occurs at a message producer before a message is sent to a message destination. A message producer system includes an administrator component, which stores message type parameters associated with a message destination. A message is created for the message destination and a validation component at the message producer system checks the created message for conformity with the stored message type parameters for the message destination. An error is reported if the message type does not conform to the stored message type parameters associated with the message destination. The validation component checks the created message for conformity after a publish call by the message producer system and before a send call and, therefore, prevents an invalid or non-conforming message from being sent.

15 Claims, 3 Drawing Sheets

MESSAGE PRODUCER WITH MESSAGE TYPE VALIDATION

CROSS-REFERENCE TO RELATED APPLICATIONS

Pursuant to 35 U.S.C. 119, Applicant claims a right of priority to European Patent Application 09154251.4 filed 3 Mar. 2009.

BACKGROUND

This invention relates to the field of messaging systems and message validation. In particular, the invention relates to message type validation.

Strong typing is used to describe situations where programming languages specify the type of a destination upfront, and enable checking and optimization by the software platform that a software application uses.

Messaging systems often do not have strong typing and rely on the producer and consumer of a message having an implicit understanding of the types of messages that are being conveyed.

The Java Message Service (JMS) specification (Java is a trademark of Sun Microsystems, Inc.) provides for a selector associated with a message consumer, which filters out messages at message receipt time, Messages are only delivered to a consumer if they pass the selector's test. However, no such check is made when the message is sent, so the message producer is unaware of this filtering.

It is also known in some messaging systems to assert that messages published on a particular topic must conform to a particular schema, for example, WebSphere topics (WebSphere is a trademark of International Business Machines Corporation).

Code generation is also used to do type checking. A piece of code (sometimes referred to as a stub) is generated and linked into a sending application. This piece of code is responsible for generating the message on behalf of the sending application of a correct type. The disadvantage of code generation is that, if the type definition changes, then either all the stubs have to be regenerated and relinked with all the senders, or the system has to recognize that there are multiple levels of stubs deployed and perform a fix after the message has been sent.

SUMMARY

According to a first embodiment of the present invention, there is provided a method for message type validation at a message producer before a message is sent to a consumer. The method includes setting message type parameters associated with a defined destination for messages, creating a message for a destination and checking the created message for validity against the set type parameters for the destination.

Preferably, checking the created message for validity is carried out after a publish call by the message producer and before a send call. The method may include generating an error report if the message type is not valid for the destination. The message created may be a one-way message where a response is not expected. Setting message type parameters may include setting one or more of: message class, message properties, and message content. The message may comprise a Java Message Service (JMS) message and type parameters may be set for a destination administered object.

According to a second embodiment of the present invention there is provided a computer software product for message type validation at a message producer before a message is sent to a consumer, the product comprising a computer-readable storage medium, storing a computer in which program comprising computer-executable instructions are stored, which instructions, when read executed by a computer, perform the following steps: setting message type parameters associated with a defined destination for messages; creating a message for a destination; and checking the created message for validity against the set type parameters for the destination.

According to a third embodiment of the present invention there is provided a message producer system with message type validation before a message is sent to a consumer, comprising: a processor; an administrator component at which message type parameters are set associated with a defined destination for messages; a message creator for creating a message for a destination; and a validation component checking the created message for validity against the set type parameters for the destination in the administrator component.

The validation component may be attached to a JMS destination administered object. Alternatively, the validation component may be attached directly to the message producer. The administrator component may include the validation component and an internal copy of the message may be sent to the administrator component for checking prior to the message being sent. The system may also include an error reporting component for generating an error if the message type is not valid for the destination.

The advantage of the described method and system is that a strongly typed system is provided such that a message does not leave the sending application or publisher if a failure has occurred. Errors in type are corrected up front and the corrected message can be sent to its destination. This means that a more timely response can be sent to the sending application.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures and components have not been described in detail so as not to obscure the present invention.

A method and system are described for message validation. In particular, the message validation may be used in a messaging environment in which a one-way message is sent without the message producer expecting a response. The described method and system provide a run-time check at the message producer of the message against rules to ensure that the message conforms to one or more parameters.

The check is carried out upon publication of a message, but before a send call. If a failure occurs, an error is immediately raised to the message producer. This is unusual behavior in a one-way or "fire and forget" messaging environment, as the producer does not normally expect to receive responses.

Messaging environments transfer messages between message producers and message consumers via an intermediary component, such as a message queue. The intermediary component allows clients (message producers and consumers) to communicate indirectly.

A messaging environment may be a point-to-point or queuing model, or a publish and subscribe model. In the point-to-point or queuing model, a producer posts messages to a particular queue and a consumer reads messages from the queue. The producer knows the destination of the message and posts the message directly to the consumer's queue. In the publish/subscribe model, messages are published to a particular message topic. Subscribers may register to receive messages on a particular topic.

The described method and system apply to both forms of messaging environment as the validation check is carried out at a message producer client and is, therefore, independent of the subsequent form of delivery of the message.

The described method and system are described in the context of Java Message Service (JMS). JMS API is a Java Message Oriented Middleware (MOM) API for sending messages between two or more clients. The described method and system could equally be used in other forms of messaging environment; for example, a WebSphere MQ (WebSphere MQ is a trademark of International Business Machines Corporation) messaging system using the Message Queuing Interface (MQI) API.

Figure 1:
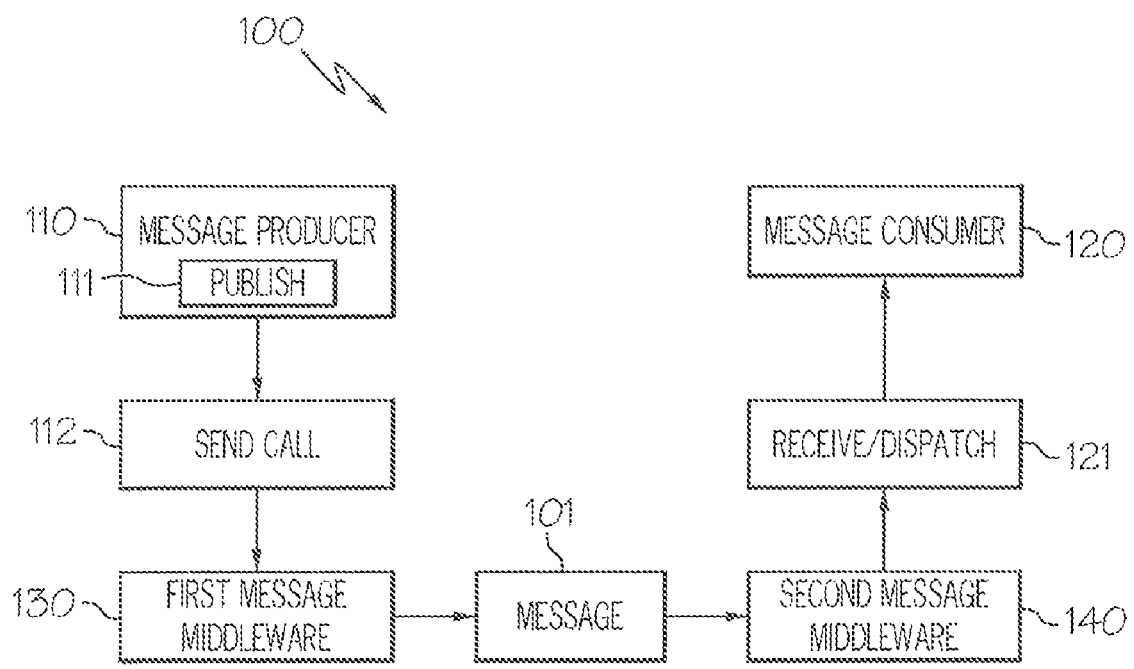
FIG. 1 is a block diagram of a messaging system as known in the prior art.

Referring to FIG. 1, a simplified messaging environment 100 is shown. A message producer 110 and a message consumer 120 are shown. The message producer 110 and message consumer 120 are client applications, and a client application may act as both a message producer and a message consumer. A message producer 110 creates a message and publishes 111 the message. A send call 112 sends the message to a first messaging middleware 130.

The first messaging middleware 130 communicates to send the message 101 to a second messaging middleware 140. The message consumer 120 receives the message by a receive/dispatch call 121 from the second messaging middleware 140. The first and second messaging middleware 130, 140 are provided as client/server infrastructures to the message producer and message consumer client applications 110, 120. The clients and servers run on one or more computers connected by a network.

Figure 2:
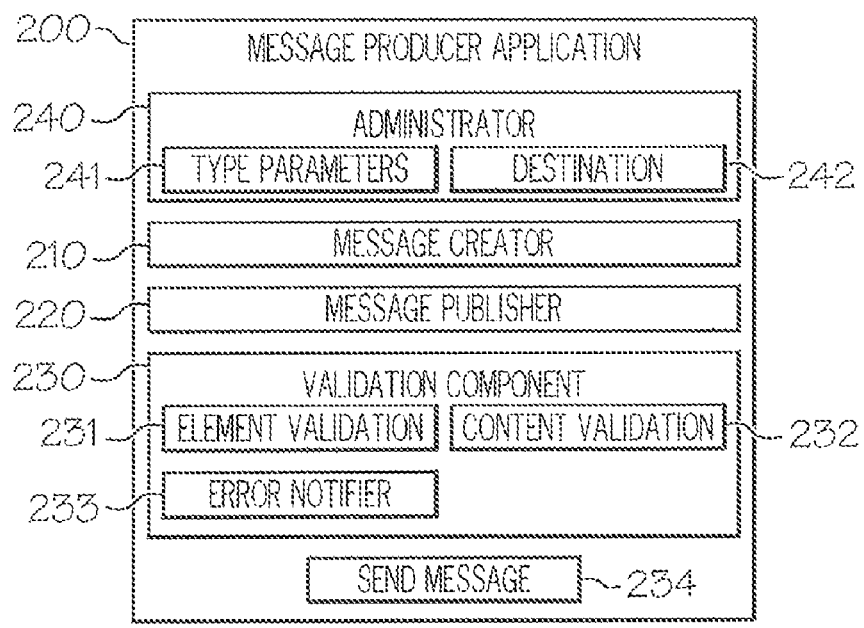
FIG. 2 is a block diagram of a message producer in accordance with the present invention.

Referring to FIG. 2, a block diagram of one embodiment of a message producer application 200 of the current invention is illustrated. The message producer application 200 includes an administrator component 240 in which type parameters 241 can be set for a defined destination 242. The message producer application 200 includes a message creator component 210 and a message publisher component 220.

In order to provide the message validation that a created message conforms to the type settings for a destination as set in the administrator component, in the described system the message producer application 200 includes a validation component 230 including a set of rules for element validation 231 and/or content validation 232. An element is a class or property of the message and content is the content of a message body. The validation component 230 also includes an error notifier 233. In one embodiment, the validation component 230 may be provided as part of the administrator component 240. A send message component 234 sends the message in response to the validation component 230 determining that the message type conforms to the destination type setting parameters.

Figure 3:
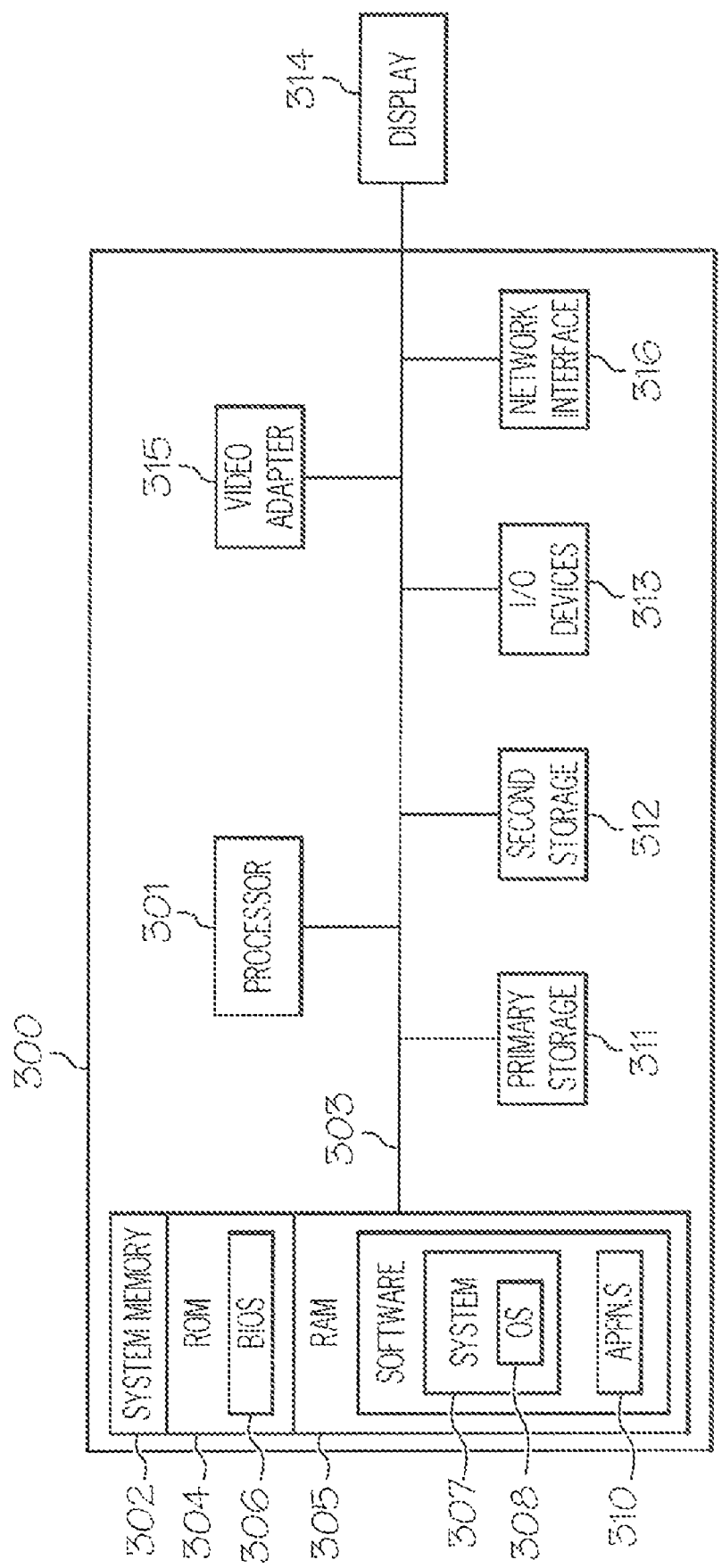
FIG. 3 is a block diagram of a computer system in which the present invention may be implemented.

Referring to FIG. 3, an exemplary system for implementing the client and server systems of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories, which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also he stored in RAM 305.

The system 300 may also include a primary storage means 311 such as a magnetic hard disk drive, and secondary storage means 312 such as a magnetic disk drive and an optical disk drive. The drives and their associated computer-readable media provide non-volatile storage of computer-executable instructions, data structures program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, satellite dish, scanner, or the like). Output devices may include speakers, printers. etc. A display device 314 is also connected to system bus 303 via an interface, such as video adapter 315.

Figure 4:
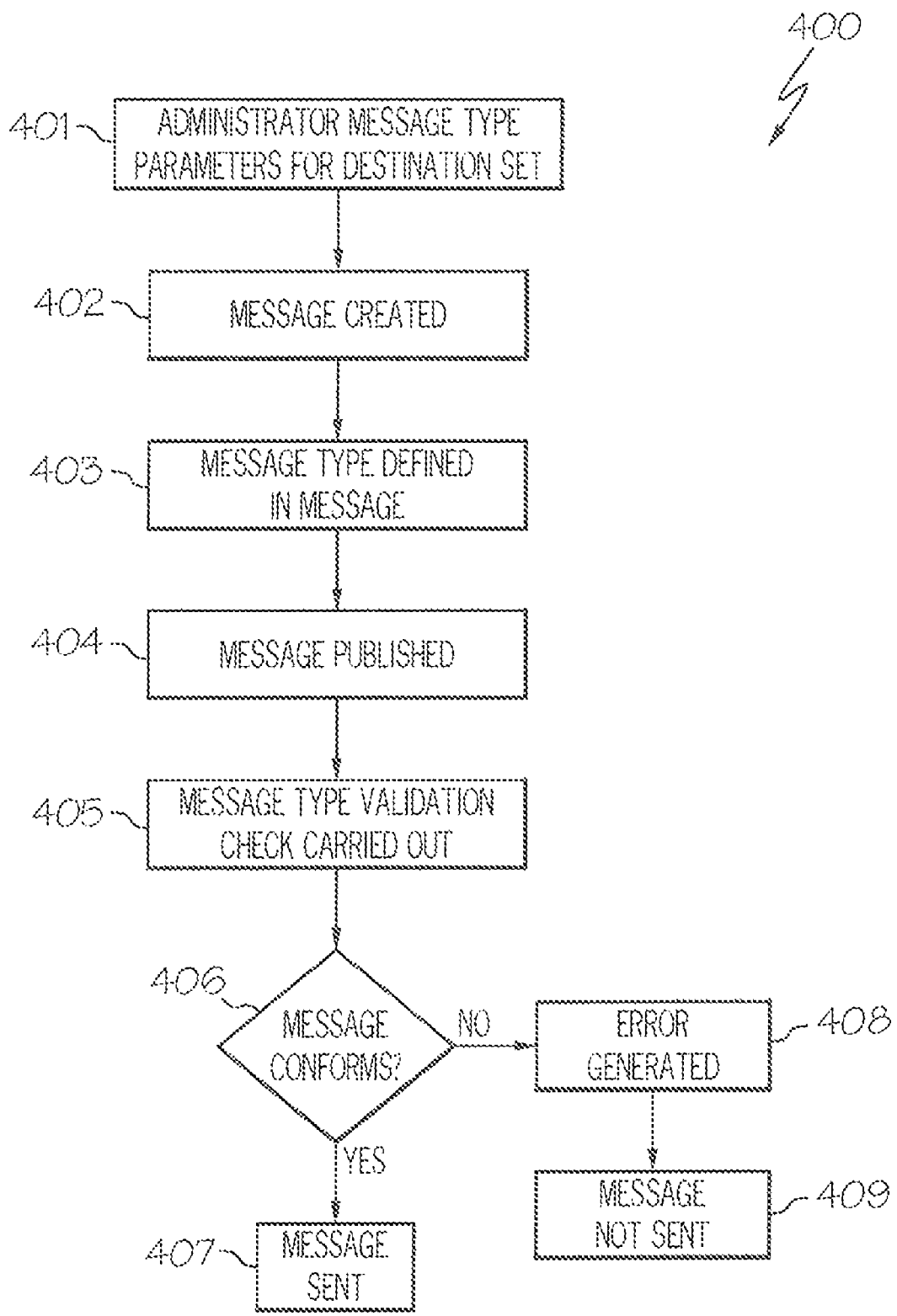
FIG. 4 is a block diagram of a schematic flow diagram showing a method in accordance with the present invention.

Referring to FIG. 4, a flow diagram 400 of one embodiment of the current invention illustrates a method for use at a message producer. Message type parameters for defined destinations are set at an administrator in step 401. A message is created in step 402 and the message type is defined in step 403 and as described further below. The message is published by the message producer in step 404.

A type validation check is then carried out in step 405. The type validation check may check a number of parameters; for example, elements such as class, property, delivery mode, user properties, and/or content of the body, etc. It is determined if the message conforms to the defined type parameters in step 406. If the message conforms, it is sent by a send call function in step 407. If the message does not conform, an error message is generated in step 408 and the message is not sent in step 409. Note that many of these steps may be carried out in a different order than as illustrated in FIG. 4 without deviating from the invention.

The described method and system provide a run-time check of a message to ensure that it conforms to one or more parameters. The check occurs upon publication, before a message is sent to the receiving side. If a failure is detected, an error is immediately raised to the producing application. This allows for a strongly typed system such that the message does not leave the producing application if a failure has occurred. This ensures that a timely error indication is sent to the producing application.

Example embodiments will now be described using JMS terminology. JMS relies strongly on the concept of administered objects. These are objects that are defined by an administrator up-front to the application. These objects are one of two types: Connection Factories; or destinations. One embodiment of the described method and system uses administered destinations. The validation component is attached to the JMS destination administered object.

In an alternative embodiment, a programming interface could be provided to give the same function as the administered destinations. The validation component is attached directly to the message producer.

It is possible to cast the administered Objects (destination in this case) to their specific type and these specific types have an interface defined on them. In this case, the interface might be checkTyping(message), so the final code would be:

```
TextMessage message = jmsSession.createTextMessage("My typed Message");
message.setStringProperty("myStringProperty", "foo");
<Fill in rest of Message>
Destination destination = initialContext.lookup(destinationAlias);
try
{
((IBMTypeCheckingDestination)destination).checkTyping(message);
}
catch(TypingException exception)
{
// deal with typing exception
}
```

In order to allow the underlying JMS producer to check that the application is sending a message of the correct type on any given destination, the typing algorithm is tied to the destination. Various rules can be used in the algorithm and these rules can be used by the producer at run-time to ensure that messages are being correctly used for any given destination.

Most message-oriented middleware (MOM) products treat messages as lightweight entities that consist of a header and a payload. The header contains fields used for message routing and identification; the payload contains the application data being sent.

JMS messages are composed of the following parts:

Header—All messages support the same set of header fields. Header fields contain values used by both clients and providers to identify and route messages.

Properties—Each message contains a built-in facility for supporting application-defined property values. Properties provide an efficient mechanism for supporting application-defined message filtering.

Body—The JMS API defines several types of message body, which cover the majority of messaging styles currently in use.

The JMS API defines five types of message body:

Stream—A Stream Message object's message body contains a stream of primitive values in the Java programming language ("Java primitives"). It is filled and read sequentially.

Map—A MapMessage object's message body contains a set of name-value pairs, where names are String objects, and values are Java primitives. The entries can he accessed sequentially or randomly by name. The order of the entries is undefined.

Text—A TextMessage object's message body contains a java.lang.String object. This message type can be used to transport plain-text messages, and XML messages.

Object—An ObjectMessage object's message body contains a Serializable Java object.

Bytes—A BytesMessage object's message body contains a stream of uninterrupted bytes. This message type is for literally encoding a body to match an existing message format.

A Message object contains a built-in facility for supporting application-defined property values. In effect, this provides a mechanism for adding application-specific header fields to a message. Properties allow an application, via message selectors, to have a JMS provider select, or filter, messages on its behalf using application-specific criteria. Property values can be Boolean, byte, short, int, long, float, double and String. Property values are set prior to sending a message.

A Destination object encapsulates a provider-specific address. The JMS API also supports a client's use of provider-specific address names. A Destination object is a JMS administered object. JMS administered objects are objects containing configuration information that are created by an administrator and later used by JMS clients. They make it practical to administer the JMS API in the enterprise.

A number of alternative mechanisms can be used to allow strong typing. The type parameters or settings can be set to include:

a) Selection on elements of a message including the class of message and properties of a message; and/or b) Selection based on the content of the message payload.

Selection on Elements of a Message

Elements of a message, which can be used for defining message types include the following:

JMS defines five message types up-front: Bytes, Text, Stream, Map and Object messages.

JMS defines certain well-known properties on a message, of interest when typing are: Type. Delivery Mode, replyTo, redelivered, priority, expiration.

JMS also defines that a message can have arbitrary user properties which are (name, value pairs).

In one embodiment, the typing of a destination can take any combination of the above elements and a message sent on such a destination must follow the defined criteria. For example:

A destination could specify that all messages on a particular destination must be of type BytesMessage.

A destination could specify that all messages on a particular destination must have a delivery mode of NON-PERSISTENT.

A destination could specify that all messages on a particular destination must have a user property of type String with name="propertyone".

Or any combination of the above.

In prior art systems, an element such as the delivery mode can be associated with a destination, which overrides a setting made by the application. In the prior art, the message is accepted whatever value the application set and its delivery mode is changed to take the administered value. In the described system, the message is rejected by the validation check unless the value set by the application is the same as the administered value.

Selection Based on Message Content

In another embodiment, which may be used additionally or alternatively, a message body content may be checked for validation with a message type for a destination. A type may be used on one or more destinations, as it could be a pointer to a central repository of known types.

Within certain of the well known JMS message types, it is possible to check that the message body conforms to the destination type. Messages may be sent with no body at all to which this aspect does not apply.

A list of the message types and body content requirements follows:
BytesMessage:
A given Bytes message may be intended as a serialization of a COBOL or C data structure and so may have a known length, or known fixed fields at certain points.
A Bytes message may alternatively be a serialized XML message and, thus, could be validated using an XML parser.
A Bytes message body could be of any type and interfaces may be allowed whereby a type ratifier can be assigned to the type within the messaging system.
TextMessage
It is possible to check such a message for conformance to a particular type using regular expressions; for example, if a text message body equates to a particular regular expression, then it conforms to the type.
A Text message may contain XML content and could be validated by an XML parser.
A Text message may also contain EDI formatted messages and could be validated by an EDI parser.
ObjectMessage:
It is possible to check that an Object body is of a specific type, for example, type Foo is being sent.
MapMessage:
It is Map and Stream messages which are most suited for type checking It is possible in the same way as that of user properties, that the type of a destination can specify that certain name, value pairs be in a Map message and that that value be of a particular type, e.g., String.
StreamMessage:
With a Stream message it is possible to define, for any given arbitrary element in the stream, what type of element it is, for example, element 3=String.
It is also possible to define certain properties of a value, for example, a String is less than n characters in length.

Once the above have been defined logically, there are various methods of implementing the validation check. Two embodiments are described, herein, which illustrate ways to encapsulate this information such that the JMS message producer can deduce the type and, thus, check the messages flowing on a given destination.

Serializer

A generic method of type checking is to define an interface, whereby, the administrator of a JMS system (or tooling generated) is given an internal copy of a JMS message just prior to it being sent. The message can then be checked for type conformance as above.

For example, an incoming message is a Stream message. It is possible that the serializer reads in the Stream message, creates a JMS Object message, and returns that instead of the incoming Stream message while doing the conversion. This function is most likely to be seen in the following scenario. An incoming message is a JMS Stream message and the application would like to be able to select messages. JMS only specifies message selection based on properties, so the conversion routine could map the body of the incoming Stream message into user properties and, thus, message selection can be achieved.

Stream Counting

An alternative type checking method applies purely to a Stream message such that it is possible to define the indexes and types at the indexes in a message. The stream message can then be checked on publication that it conforms to the type, which is much simpler than the above serializer pattern.

The described methods and systems have the advantage of reducing the load on a server supporting messaging middleware in a client/server environment, as the validation check is carried out at the client removing the burden of any invalid messages from the server.

In known validation systems in messaging environments, a validation check may be performed at the receiving or consumer side. The advantage of carrying out a validation check at the producer side is that a more timely notification of an error is received. If the validation check is carried out at the consumer side, a message must he received before a check can be made. If the messaging is asynchronous and the consumer is not running at the time of the send call, this could make a significant time saving. It also reduces network traffic, as invalid messages are not sent by the messaging middleware. The validation system may be provided to a client as a service over a network.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this document, a computer readable storage medium may be any tangible medium that can contain, or store a program for use by or in connection with an instruction execution system, apparatus or device.

A computer readable signal medium may include a propagated data signal with computer readable program code embodied therein; for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

Improvements and modifications can be made to the foregoing without departing from the scope of the present invention.

What is claimed is:

1. A method for message type validation at a message producer before a message is sent to a message destination in a one way messaging environment, comprising:
    creating, at a client message producer, the message for transfer to a client consumer at the message destination;
    inserting, at the client message producer, at least one message type parameter into the message, said at least one message type parameter comprising at least one of a message class, a message property, or a message content required for acceptance of said message by said client consumer at said message destination; and
    checking, at the client message producer, prior to sending said message, the message type parameter for conformity with said required message type parameter of said client consumer at said message destination.

2. The method of claim 1, further comprising not sending the message from said client message producer when the message type parameter does not conform to said required message type parameter of said client consumer at said message destination.

3. The method of claim 2, further comprising:
    generating an error report for the client message producer in response to the message type parameter not conforming with said required message type parameter of said client consumer at said message destination; and
    correcting, in response to said error report, said required message type parameter to conform with said required message type parameter of said client consumer at said message destination.

4. The method of claim 1, further comprising sending said message from said client message producer in response to the message type parameter conforming with said required message type parameter of said client consumer at said message destination.

5. The method of claim 1, wherein the message comprises a Java Message Service (JMS) message and said required message destination type parameter is set for an administered object of the message destination.

6. A computer program product for message type validation at a message producer before a message is sent to a message destination in a one way messaging environment, the computer program product comprising a computer readable storage medium having computer readable program code embodied therewith, the computer readable program code:
    computer readable program code configured to set, at a message producer, a destination type parameter associated with a message destination;
    computer readable program code configured to create, at the message producer, a message for the message destination;
    computer readable program code configured to define, at the message producer, a message type for the message; and
    computer readable program code configured to check, at the message producer prior to sending the message, the message type for conformity to the destination type parameter associated with the message destination.

7. The computer program product of claim 6, further comprising computer readable program code configured to not send the message from said client message producer when the message type parameter does not conform to said required message type parameter of said client consumer at said message destination.

8. The computer program product of claim 7, the computer readable program code further comprising:
   computer readable program code configured to generate an error report for the client message producer in response to the message type parameter not conforming with said required message type parameter of said client consumer at said message destination; and
   computer readable program code configured to correct, in response to said error report, said required message type parameter to conform with said required message type parameter of said client consumer at said message destination.

9. The computer program product of claim 6, further comprising computer readable program code configured to send said message from said client message producer in response to the message type parameter conforming with said required message type parameter of said client consumer at said message destination.

10. The computer program product of claim 6, wherein the message comprises a Java Message Service (JMS) message and said required message destination type parameter is set for an administered object of the message destination.

11. A system for message type validation at a message producer before a message is sent to a message destination in a one way messaging environment, comprising:
   a processor; and
   memory connected to the processor, wherein the memory is encoded with instructions and wherein the instructions when executed comprise:
      instructions for creating, at a client message producer, a message for transfer to a client consumer at the message destination;
      instructions for inserting, at the client message producer, at least one message type parameter into the message, said at least one message type parameter comprising at least one of a message class, a message property, or a message content required for acceptance of said message by said client consumer at said message destination; and
      instructions for checking, at the client message producer, prior to sending said message, the message type parameter for conformity with said required message type parameter of said client consumer at said message destination.

12. The system of claim 11, further comprising instructions to not send the message from said client message producer when the message type parameter does not conform to said required message type parameter of said client consumer at said message destination.

13. The system of claim 12, further comprising:
   instructions for generating an error report for the client message producer in response to the message type parameter not conforming with said required message type parameter of said client consumer at said message destination; and
   instructions for correcting, in response to said error report, said required message type parameter to conform with said required message type parameter of said client consumer at said message destination.

14. The system of claim 11, further comprising instructions for sending said message from said client message producer system in response to the message type parameter conforming with said required message type parameter of said client consumer at said message destination.

15. The system of claim 11, wherein the message comprises a Java Message Service (JMS) message and said required message destination type parameter is set for an administered object of the message destination.

* * * * *